Patented Dec. 20, 1927.

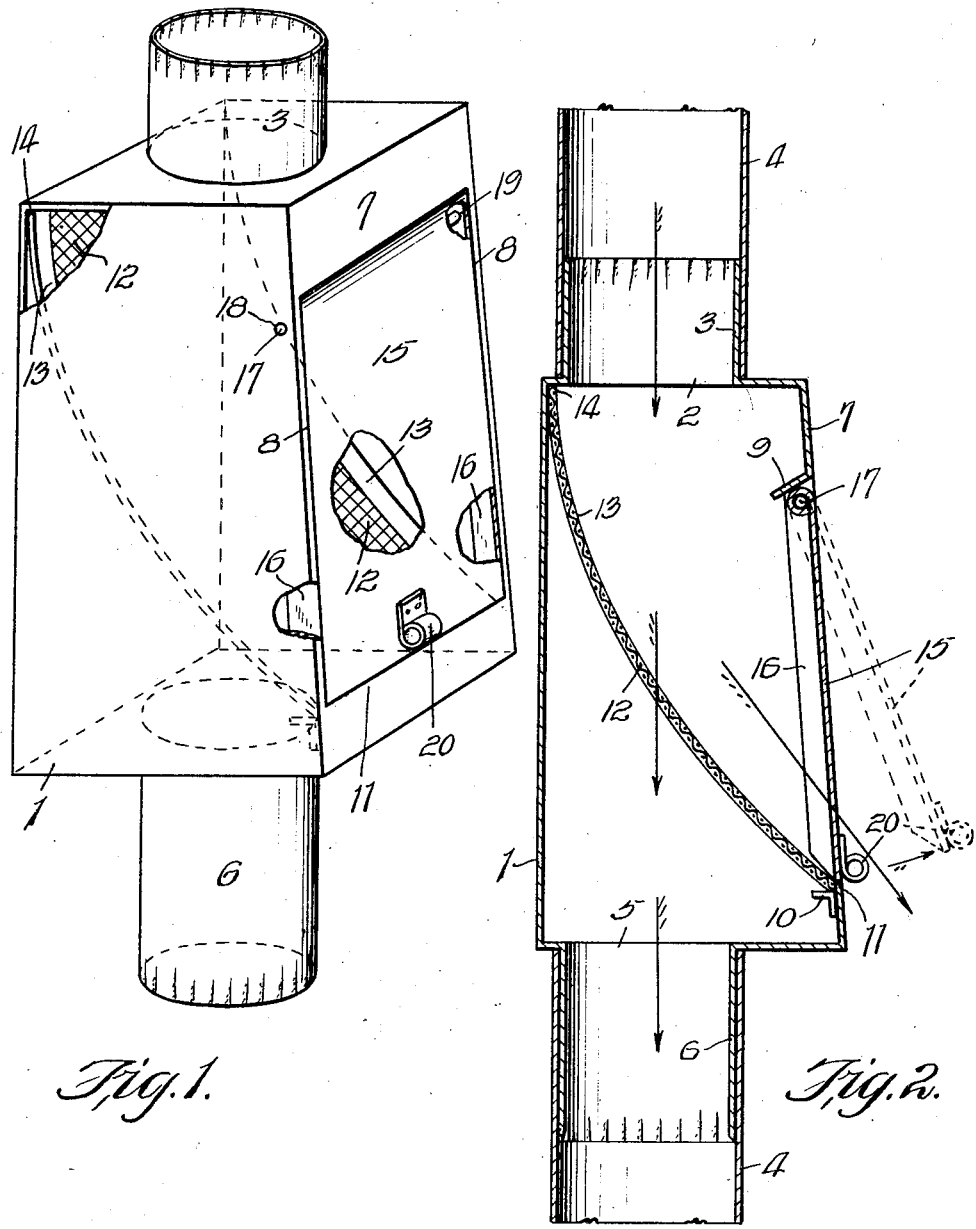

1,653,473

UNITED STATES PATENT OFFICE.

OTTO E. SCHULZ, OF LABADDIE, MISSOURI, ASSIGNOR OF ONE-HALF TO JOSEPH E. JAHRAUS, OF LABADDIE, MISSOURI.

WATER FILTER.

Application filed November 12, 1925. Serial No. 68,545.

My invention relates to water filters, and more particularly to water filters connected to down spouts, or drain pipes leading from the gutters of buildings for carrying rain waters to cisterns, sewers and the like, and, it is a distinct and practical improvement to overcome certain practical objections to, and defects in, filters of the character specified.

The object of my invention is to provide a filter casing for interposition in a down drain pipe which is provided with an inlet opening, an opposed outlet opening, a lateral foreign matter discharge opening, an interior curved screen and a gravity controlled closure for the lateral opening.

A further object of my invention is to provide a water filter which possesses advantages in points of simplicity and efficiency, and, at the same time proves itself comparatively inexpensive in cost of manufacture.

With the above and other objects in view, the invention consists in the novel features of construction, arrangement and combination of parts hereinafter more fully described and finally pointed out in the claim hereto appended.

Referring to the accompanying drawings forming a part of this specification, wherein like characters of reference denote similar parts throughout the several views:

Fig. 1 is a perspective view of a water filter embodying the feature of my invention.

Fig. 2 is a vertical sectional view of the device.

In carrying out the aim of my invention, I employ a filter casing 1 provided in its upper wall with an inlet opening 2 from which extends a stub-pipe 3 for connection with a drain pipe 4. The lower wall of the casing is provided with an opposed outlet opening 5 from which extends a stub-pipe 6 for connection with the drain pipe 4.

The front wall 7 of the casing 1 is inclined downwardly and outwardly from the top wall of the casing 1 and is provided with a suitable front foreign matter discharge or outlet opening 8. The front wall 7 is provided with an inwardly and downwardly directed splash lip 9 at the upper end of the front outlet opening 8. The front wall 7 is also provided upon its inner face with an angular rest plate 10 which is positioned a suitable distance below the lower edge of the opening 8 to provide a stop shoulder 11.

Disposed within the casing 1, is a strainer or filter screen 12 having its side edges reinforced by means of U-shaped metallic side strips 13. This screen and its side strips are curved or dished downwardly with the upper edge of the screen in contact with the upper rear corner 14 of the casing 1 and with its lower edge resting upon the angular shaped plate 10 and in contact with the shoulder 11 for firmly but removably holding the screen in position in a curved inclined position within the casing 1, as clearly shown in Fig. 2, so as to direct all foreign matter, such as leaves, bird-nests, and the like that may descend through the down-pipe 4, out through the lateral or front opening 8 instead of permitting same to continue through the casing 1 and into the lower down-pipe section 4 to find its way into a cistern, sewer, or the like.

The front opening 8 is provided with a suitable closure 15 having its side edges flanged or bent inwardly, as at 16, to reinforce the side edges of the closure 15 and to provide a close sliding fit with the side wall of the casing 1. The upper end of the closure 15 is hingedly connected to the side walls of the casing 1 by means of a suitable hinge pin 17 passing through openings 18 in the side flanges 16 of the closure 15 and openings 19 in side walls of the casing 1. The lower end of the closure is provided with a suitable finger hold 20 for opening the closure 15 when desired.

The closure 15 is automatically opened by the weight of any foreign matter that passes into the casing 1 from the drain pipe 4 owing to the fact that such foreign matter will slide down the screen 12 and strike the closure 15 thereby opening the closure 15, as shown in dotted lines in Fig. 2, and permitting of the self discharge of foreign matter from within the casing 1 through the opening 8 that may find its way into the casing and upon the curved inclined screen 12. The closure 15 will automatically close itself by gravity due to being hinged at its upper end and disposed at a slight angle in its normally closed position.

While the foreign matter will be discharged through the lateral or front opening 8, it will be observed that the water will pass through the screen 12 and passing out of the casing 1 through the outlet opening 5.

The many advantages of the herein described invention will readily suggest themselves to those skilled in the art to which it appertains.

I do not wish to be understood as having limited myself to the exact details of construction shown and described, but desire to have it understood that the invention I have shown in the drawings is merely illustrative, as it is manifest that various minor changes may be made in the exact construction and particular arrangement of parts without departing from the spirit of my invention, hence I reserve the right to make any such changes, or modifications as may fairly fall within the scope of the appended claim when fairly construed.

What I claim is:

In a device of the class described for down spouts, a casing having front, back, side, top and bottom walls, an inlet stub pipe connected to and directed upwardly from said top wall, an outlet stub pipe connected to and directed downwardly from said bottom wall, said front wall being inclined downwardly and provided with a foreign matter discharge opening, a closure for said discharge opening, rearwardly directed side flanges for said closure, a hinge eye formed at the upper end of said closure, a hinge pin supported at its ends by the side walls of the casing and passing through the hinge eye of the closure, a splash lip directed inwardly and downwardly from the front wall of the casing adjacent the hinge eye of the closure, a rest plate fixed to the inner face of the front wall of the casing adjacent the lower end of the discharge opening thereof, a removable screen disposed within the casing with its lower edge resting upon said rest plate and its upper edge in contact with the inner faces of the rear and upper walls of the casing to retain the screen in a downwardly inclined curved position and side edge reinforcing plates for said screen.

In testimony whereof, I have hereunto signed my name to the specification.

OTTO E. SCHULZ.